(12) United States Patent
Mizuno et al.

(10) Patent No.: US 9,777,790 B2
(45) Date of Patent: Oct. 3, 2017

(54) SHOCK ABSORBER

(71) Applicants: TOYOTA JIDOSHA KABUSHIKI KAISHA, Aichi (JP); HITACHI AUTOMOTIVE SYSTEMS, LTD., Ibaraki (JP)

(72) Inventors: Kazuyuki Mizuno, Susono (JP); Ryousuke Kamae, Yokohama (JP); Hideki Hata, Yokohama (JP); Sadatomo Matsumura, Yokohama (JP)

(73) Assignees: TOYOTA JIDOSHA KABUSHIKI KAISHA, Aichi (JP); HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/022,097

(22) PCT Filed: Oct. 29, 2014

(86) PCT No.: PCT/JP2014/078773
§ 371 (c)(1),
(2) Date: Mar. 15, 2016

(87) PCT Pub. No.: WO2015/064643
PCT Pub. Date: May 7, 2015

(65) Prior Publication Data
US 2016/0258504 A1 Sep. 8, 2016

(30) Foreign Application Priority Data
Oct. 31, 2013 (JP) ................. 2013-226825

(51) Int. Cl.
*F16F 9/348* (2006.01)
*F16F 9/18* (2006.01)
*F16F 9/19* (2006.01)

(52) U.S. Cl.
CPC ............ *F16F 9/3485* (2013.01); *F16F 9/348* (2013.01); *F16F 9/3484* (2013.01); *F16F 9/185* (2013.01);
(Continued)

(58) Field of Classification Search
CPC ........ F16F 9/3485; F16F 9/348; F16F 9/3484; F16F 9/19; F16F 9/185; F16F 9/3487; F16F 2238/04; B60G 13/08
(Continued)

(56) References Cited

U.S. PATENT DOCUMENTS 4,964,493 A * 10/1990 Yamaura ............... F16F 9/3484
188/280
5,129,488 A * 7/1992 Furuya .................. B60G 17/08
188/282.6
(Continued)

FOREIGN PATENT DOCUMENTS

| JP | 2004-125023 | 4/2004 |
|---|---|---|
| JP | 2007-232059 | 9/2007 |
| JP | 2013-113425 | 6/2013 |

OTHER PUBLICATIONS

International Search Report issued Dec. 9, 2014 in International Application No. PCT/JP2014/078773.

*Primary Examiner* — Thomas Irvin
(74) *Attorney, Agent, or Firm* — Wenderoth, Lind & Ponack, L.L.P.

(57) ABSTRACT

A shock absorber including a piston (3) slidably fitted in a cylinder having hydraulic oil sealed therein. A flow of hydraulic oil, induced in a passage (10) and a sub-passage (29) by sliding movement of the piston in the cylinder in response to the stroke of a piston rod, is controlled by an extension main valve (14) and a compression sub-valve (15) incorporated in the extension main valve, thereby generating a damping force. The amount of deflection of a sub-disk (30)

(Continued)

constituting the compression sub-valve when the sub-disk is opened is limited by restricting portions (21). The sub-disk is provided with communicating holes (31) to reduce a differential pressure acting on the sub-disk when opened and also to relax the concentration of stress in the sub-disk, thereby improving the durability of the sub-disk.

4 Claims, 4 Drawing Sheets

(52) U.S. Cl.
CPC ............... *F16F 9/19* (2013.01); *F16F 9/3487* (2013.01); *F16F 2238/04* (2013.01)
(58) Field of Classification Search
USPC .......................... 188/282.5, 322.15, 313, 317
See application file for complete search history.

(56) References Cited

U.S. PATENT DOCUMENTS

| | | | | |
|---|---|---|---|---|
| 5,261,448 A * | 11/1993 | Furuya | ................... | B60G 17/08 137/513.5 |
| 5,529,154 A * | 6/1996 | Tanaka | ................... | F16F 9/3484 188/280 |
| 5,690,195 A * | 11/1997 | Kruckemeyer | ....... | F16F 9/3485 188/280 |
| 6,202,805 B1 * | 3/2001 | Okada | ................... | F16F 9/3214 188/266.2 |
| 6,382,372 B1 * | 5/2002 | Keil | ........................ | F16F 9/348 188/322.14 |
| 6,634,379 B2 * | 10/2003 | Asadi | .................... | F16F 9/3214 137/512.1 |
| 6,668,986 B2 * | 12/2003 | Moradmand | ........... | F16F 9/466 188/266.2 |
| 7,040,468 B2 * | 5/2006 | Shinata | .................... | F16F 9/348 188/282.6 |
| 7,322,449 B2 * | 1/2008 | Yamaguchi | .............. | F16F 9/348 188/282.3 |
| 7,458,448 B2 * | 12/2008 | Katou | .................... | F16F 9/3485 188/282.6 |
| 7,694,785 B2 * | 4/2010 | Nakadate | ................. | F16F 9/464 188/266.5 |
| 7,694,786 B2 * | 4/2010 | Asadi | .................... | F16F 9/3484 188/282.6 |
| 8,651,252 B2 * | 2/2014 | Katayama | ............. | F16F 9/3484 188/282.6 |
| 8,794,407 B2 * | 8/2014 | Vanbrabant | ............. | F16F 9/464 188/282.1 |
| 8,800,729 B2 * | 8/2014 | Yabe | ........................ | F16F 9/465 188/266.6 |
| 9,067,471 B2 * | 6/2015 | Tuts | ........................ | B60G 13/08 |
| 9,410,595 B2 * | 8/2016 | Yamada | ................. | F16F 9/3481 |
| 9,441,699 B2 * | 9/2016 | Lawler | ................... | F16F 9/3484 |
| 9,500,251 B2 * | 11/2016 | Okaichi | .................... | F16F 9/3484 |
| 2004/0069581 A1 | 4/2004 | Shinata | | |
| 2009/0260938 A1 * | 10/2009 | Hikosaka | .............. | F16F 9/3484 188/322.15 |
| 2015/0337918 A1 * | 11/2015 | Rummel | ................ | F16F 9/3482 188/315 |

* cited by examiner

SHOCK ABSORBER

TECHNICAL FIELD

The present invention relates to a shock absorber generating a damping force by controlling a flow of a hydraulic fluid in relation to a stroke of a piston rod.

BACKGROUND ART

In general, a shock absorber attached to a suspension system of an automobile is arranged as follows. A piston connected with a piston rod is slidably fitted in a cylinder having a hydraulic fluid sealed therein, and a flow of hydraulic fluid induced by sliding movement of the piston in the cylinder in response to the stroke of the piston rod is controlled by a damping force generating mechanism comprising an orifice, a disk valve, etc., thereby generating a damping force.

In this type of shock absorber, the valve opening characteristics of the disk valve and the flow path area of the orifice are determined so as to set optimal damping force characteristics from the viewpoint of ride quality and steering stability of the vehicle. In a shock absorber disclosed in Patent Literature 1, for example, a sub-valve functioning as a check valve is incorporated in a disk valve comprising a stack of a plurality of disks, thereby increasing the degree of freedom for setting clamping force characteristics and thus obtaining optimal damping force characteristics.

CITATION LIST

Patent Literature

[Patent Literature 1] Japanese Patent Application Laid-open Publication No. 2004-125023

SUMMARY OF INVENTION

Technical Problem

There is a demand to ensure sufficient durability of the above-described disk valve by preventing damage due to excessive deflection of and stress concentration in the disk valve when opened.

The present invention has been made in view of the above-described circumstances and an object of the present invention is to improve the durability of the sub-valve incorporated in the disk valve.

Solution to Problem

To solve the above-described problem, the present invention provides a shock absorber including a cylinder having a hydraulic fluid sealed therein, a piston slidably fitted in the cylinder, a piston rod connected to the piston and extended to the outside of the cylinder, and a damping force generating mechanism generating a damping force by controlling a flow of hydraulic fluid induced by sliding movement of the piston in the cylinder. The damping force generating mechanism includes a valve body having a passage through which the hydraulic fluid flows, a clamp portion and a seat portion which project from respective positions on the inner and outer peripheral sides of an opening of the passage in the valve body, a main valve including a stack of a plurality of main disks whose inner peripheral portion is clamped toy the clamp portion and whose outer peripheral portion is seated on the seat pore ion to close the passage and deflected and lifted to open the passage upon receiving the pressure of hydraulic fluid in the passage, a sub-passage having an opening in the main disks seated on the seat portion, and a sub-valve including a sub-disk smaller in diameter than the main disks and clamped at an inner peripheral portion thereof by the main disks and the clamp portion. The sub-disk is seated on the main disks to close the sub-passage and deflected and lifted to open the sub-passage upon receiving the pressure of hydraulic fluid in the sub-passage. The valve body is provided with a restricting portion that abuts against the sub-disk when the sub-valve is opened to limit the degree of opening of the sub-valve, and the sub-disk is provided with a communicating hole radially inward of a position at which the sub-disk abuts against the restricting portion.

Advantageous Effects of Invention

The shook absorber according to the present invention is capable of improving the durability of the sub-valve incorporated in the disk valve.

DESCRIPTION OF EMBODIMENTS

An embodiment of the present invention will be explained below in detail on the basis of the accompanying drawings.

Figure 1:
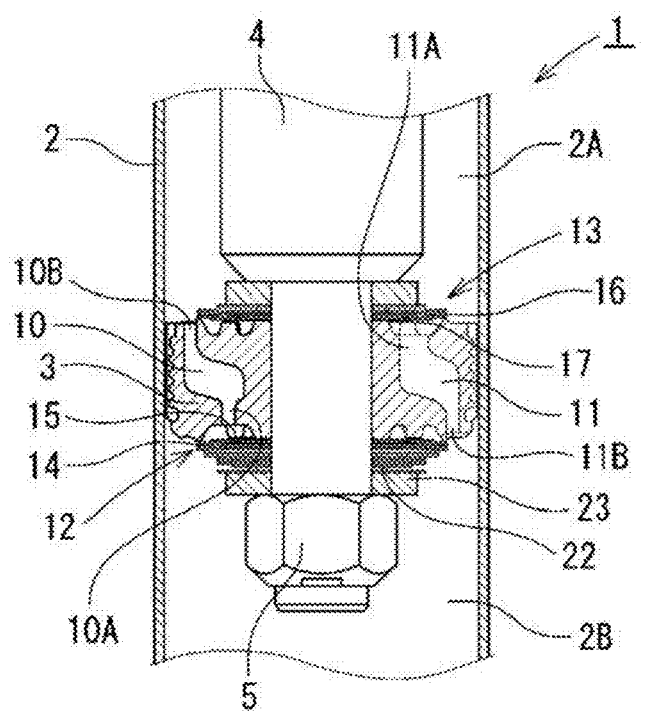
FIG. 1 is a vertical sectional view of a piston assembly as a main part of a shock absorber according to an embodiment of the present invention.

As shown in FIG. 1, a shock absorber 1 according to this embodiment is a mono-tube hydraulic shock absorber attached to a suspension system of an automobile. The shook absorber 1 includes a cylinder 2 having hydraulic oil, which is a hydraulic fluid, sealed therein, and a piston 3 slidably fitted in the cylinder 2. The piston 3 divides the interior of the cylinder 2 to define two chambers, i.e. a cylinder upper chamber 2A and a cylinder lower chamber 2B. The piston 3 has one end of a piston rod 4 extending therethrough and connected thereto with a nut 5. The other end of the piston rod 4 extends, to the outside of the cylinder 2 through a rod guide (not shown) and an oil seal (not shown), which are fitted to the end portion of the cylinder 2. The cylinder 2 has a free piston (not shown) slidably fitted in the bottom thereof to form a gas chamber to compensate for a volumetric change in the cylinder 2 due to extension and contraction of the piston rod 4 by the compression and expansion of a high-pressure gas sealed in the gas chamber.

The piston 3 is provided with passages 10 and 11 communicating between the cylinder upper and lower chambers 2A and 2B. One passage 10 has a lower end opening 10A opening on an inner peripheral region of the lower end of the piston 3 and an upper end opening 10B opening on an outer peripheral region or the upper end of the piston 3. The other passage 11 has an upper end opening 11A opening on an inner peripheral region of the upper end of the piston 3 and a lower end opening 11B opening on an outer peripheral region, of the lower end or the piston 3. The piston 3 has a first damping force generating mechanism 12 provided at the lower end thereof to generate a damping force by controlling the flow of hydraulic oil through the one passage 10. The piston 3 further has a second damping force generating mechanism 13 provided at the upper end thereof to generate a damping force by controlling the flow of hydraulic oil through the other passage 11. The first and second damping force generating mechanisms 12 and 13 use the piston 3 as a valve body.

Figure 2:
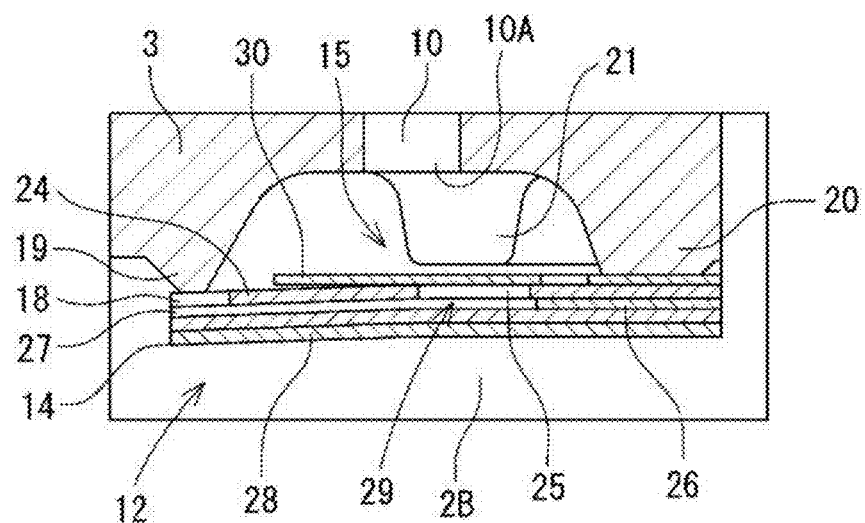
FIG. 2 is an enlarged vertical sectional view of a damping force generating mechanism of the shock absorber shown in FIG. 1.

The first damping force generating mechanism 12 comprises an extension main valve 14 (main valve) and a compression sub-valve 15 (sub-valve). The extension main valve 14 is a disk valve configured to open upon receiving the cylinder upper chamber 2A-side hydraulic oil pressure through the passage 10 and to generate a damping force according to the degree of opening thereof. The compression sub-valve 15 is incorporated in the extension main valve 14 to serve as a check valve that allows only the flow of hydraulic oil from the cylinder lower chamber 2B to the cylinder upper chamber 2A. The second damping force generating mechanism comprises a compression main valve 16 and an extension sub-valve 17. The compression main valve 16 is a disk valve configured to open upon receiving the cylinder lower chamber 2B-side hydraulic oil pressure through the passage 11 and to generate a damping force according to the degree of opening thereof. The extension sub-valve 17 is incorporated in the compression main valve 16 to serve as a check valve that allows only the flow of hydraulic oil from the cylinder upper chamber 2A to the cylinder lower chamber 2B. At least one of the first and second damping force generating mechanisms is provided with an orifice passage 18 constantly communicating between the cylinder upper and lower chambers (in the illustrated example, only the first damping force generating mechanism 12 is provided with the orifice passage 18 as shown in FIG. 2).

The first and second damping force generating mechanisms 12 and 13 are similar in structure to each other; therefore, only the first damping force generating mechanism 12 will be explained below in detail with reference mainly to FIGS. 1 to 4.

Figure 4:
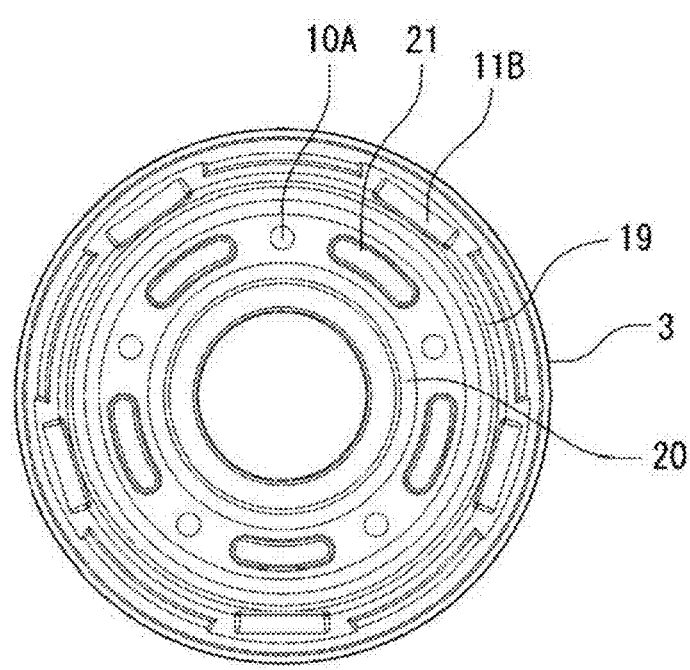
FIG. 4 is a bottom view of a piston of the shock absorber shown in FIG. 1.

As shown in FIG. 4, the lower end opening 10A of the one passage 10 comprises a plurality of circumferentially spaced circular openings 10A (five equally spaced openings 10A in the illustrated example) disposed in an inner peripheral region, of the lower end of the piston 3. The lower end opening HE of the other passage 11 comprises a plurality of circumferentially spaced elongated rectangular openings 11B (five equally spaced openings 11B in the illustrated example) disposed in an outer peripheral region of the lower end of the piston 3. Each opening 11B is disposed between a pair of adjacent openings 10A as viewed in the circumferential direction. The upper end openings 10B and 11A of the passages 10 and 11 are disposed on the upper end of the piston 3 in the same way as the lower end openings 10A and 11B.

The piston 3 has an annular seat portion 19 projecting from the lower end thereof at a position that is on the inner peripheral side of the openings 11B of the passage 11 and that is the outer peripheral side of the openings 10A of the passage 10. The piston further has an annular clamp portion 20 projecting from the lower end thereof at a position on the inner peripheral, side of the openings 10A. Further, restricting portions 21 of substantially arcuate shape in plan view project between the seat portion 19 and the clamp portion 20 at respective positions each between a pair of circumferentially adjacent openings 10A. The restricting portions 21 are lower in projection height than the seat portion 19 and the clamp portion 20 (see FIG. 2).

Figure 3:
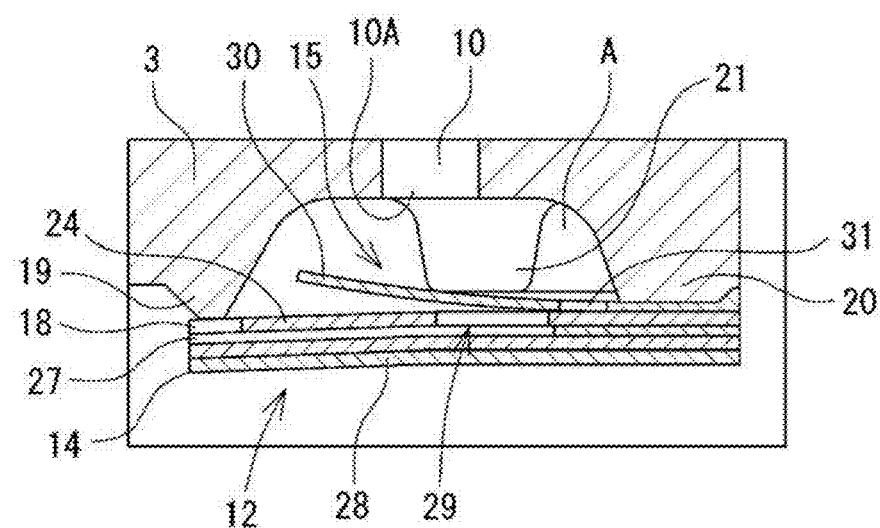
FIG. 3 is a vertical sectional view showing the way in which a sub-valve of the damping force generating mechanism shown in FIG. 2 is opened.

As shown in FIG. 2, the extension main valve 14 of the first damping force generating mechanism 12 comprises a stack of a plurality of substantially annular disks. The extension main valve 14 is clamped at an inner peripheral portion thereof by the clamp portion 20 and the nut 5 with a Spacer 22 and a retainer 23 interposed, between the extension main valve 14 and the nut 5 (see FIG. 1), and seated, at an outer peripheral portion thereof on the seat portion 19. It should be noted that FIGS. 2 and 3 show only a part of the stack of disks constituting the extension main valve 14 that is closer to the seat portion 19. The extension main valve 14 receives the cylinder upper chamber 2A-side hydraulic oil pressure through the passage 10, and when the hydraulic oil pressure reaches the valve-opening pressure, the extension main valve 14 is deflected and lifted to open, thereby generating a damping force according to the flow path thereof. The extension main valve 14, when seated on the seat portion 19, blocks the flow of hydraulic oil from the cylinder lower chamber 2B to the cylinder upper chamber 2A through the passage 10.

Next, the compression sub-valve 15 incorporated in the extension main valve 14 will be explained.

Figure 6:
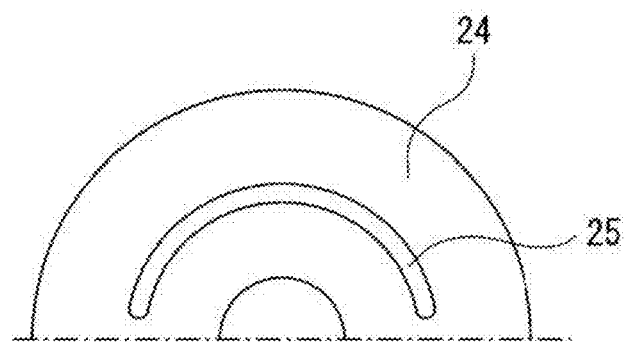
FIG. 6 is a front view of a passage disk constituting a sub-passage of the sub-valve of the damping force generating mechanism shown in FIG. 2.
Figure 7:
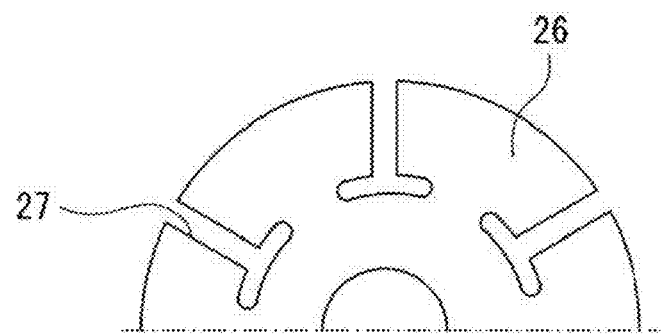
FIG. 7 is a front view of a notched disk constituting a sub-passage of the sub-valve of the damping force generating mechanism shown in FIG. 1.

Of the plurality of disks constituting the extension main valve 14, a passage disk 24 seated on the seat portion 19 has, as shown in FIG. 6, an arcuate passage opening 25 formed to face the restricting portions 21 projecting from the lower end of the piston 3. Further, the passage disk 24 has a notch (shown in only FIGS. 2 and 3; not shown in FIG. 6) provided in an outer peripheral portion thereof to constitute the orifice passage 18 constantly communicating between the cylinder upper and lower chambers 2A and 2B. A notched disk 26 stacked over the passage disk 24 is formed with a plurality of notches 27 each comprising an arcuate opening corresponding to the passage opening 25 and a rectilinear opening extending radially outward from the arcuate opening to the outer periphery of the notched disk 26. A flat plate-shaped disk 28 is stacked over the stack of the passage disk 21 and the notched disk 26, thereby allowing the passage opening 25 and the notches 27 to communicate with each other and thus forming a sub-passage 29 connecting between the passage 10 and the cylinder lower chamber 2B.

Between the passage disk 24 and the clamp portion 20 of the piston 3 is clamped an inner peripheral portion of a sub-disk 30 smaller in diameter than the passage disk 24. The sub-disk 30 functions as a check valve by seating at its outer peripheral portion on the periphery of the arcuate passage opening 25 of the passage disk 24, thereby blocking the flow of hydraulic oil from the cylinder upper chamber 2A to the cylinder lower chamber 2B through the sub-passage 29. Further, the sub-disk 30 receives the cylinder lower chamber 2B-side hydraulic oil pressure through the sub-passage 29, and when the hydraulic oil pressure reaches the valve-opening pressure, the sub-disk 30 is deflected and lifted at its outer peripheral portion from the passage disk 24 to open, thereby generating a damping force according to the flow path thereof.

Figure 5:
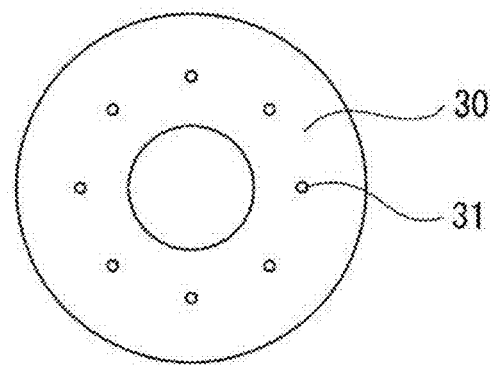
FIG. 5 is a front view of a sub-disk constituting the sub-valve of the damping force generating mechanism shown in FIG. 2.

The sub-disk 30 has, as shown in FIG. 5, a plurality of circumferentially spaced circular communicating holes 31 (eight equally spaced communicating holes 31 in the illustrated example) extending therethrough. The communicating holes 31 are disposed between the passage opening 25 of the passage disk 24 and an area between the restricting portions 21 and clamp portion 20 of the piston 3.

The compression main valve 16 and extension sub-valve 17 of the second damping force generating mechanism 13 are structured in the same way as the extension main valve 14 and compression sub-valve 15 of the first damping force generating mechanism 12. The valve-opening pressure of the extension sub-valve 17 is set lower than that of the extension main valve 14, and the valve-opening pressure of the compression sub-valve 15 is set lower than that of the compression main valve 16.

The following is an explanation of the operation of this embodiment structured as stated above.

During the extension stroke of the piston rod 4, the sliding movement of the piston 3 in the cylinder 2 causes the hydraulic oil in the cylinder upper chamber 2A to be pressurized, and the pressurized hydraulic oil flows toward the cylinder lower chamber 2B through the passages 10 and 11. At this time, when the piston speed is in a low speed region (before the extension sub-valve 17 and the extension main valve 14 open), the hydraulic oil flows through the orifice passage 18, thus generating a damping force of orifice characteristics in which the damping force is substantially proportional to the square of the piston speed.

When the piston speed increases and consequently the pressure of hydraulic oil in the cylinder upper chamber 2A reaches the valve-opening pressure of the extension sub-valve 17, the extension sub-valve 17 opens, and a damping force of valve characteristics in which the damping force is substantially proportional to the piston speed, is generated according to the degree of opening of the extension, sub-valve 17.

When the piston speed further increases and consequently the pressure of hydraulic oil in the cylinder upper chamber 2A reaches the valve-opening pressure of the extension main valve 14, the extension main valve opens, and a damping force of valve characteristics is generated according to the degree of opening of the extension main valve 14.

During the compression stroke of the piston rod 4, the sliding movement of the piston 3 in the cylinder 2 causes the hydraulic oil in the cylinder lower chamber 2B to be pressurized, and the pressurized hydraulic oil flows toward the cylinder upper chamber 2A through the passages 10 and 11. At this time, when the piston speed is in a low speed region (before the compression sub-valve 15 and the compression main valve 16 open), the hydraulic oil flows through the orifice passage 18, thus generating a damping force of orifice characteristics.

When the piston speed increases and consequently the pressure of hydraulic oil in the cylinder lower chamber 2B reaches the valve-opening pressure of the compression sub-valve 15, the compression sub-valve 15 opens, and a damping force of valve characteristics is generated according to the degree of opening of the compression sub-valve 15.

When the piston speed further increases and consequently the pressure of hydraulic oil in the cylinder lower chamber 2B reaches the valve-opening pressure of the compression main valve 16, the compression main valve 16 opens, and a damping force of valve characteristics is generated according to the degree of opening of the compression main valve 16.

Thus, as the piston speed increases, the extension sub-valve 17 and the extension main valve 14 open successively during the extension stroke, and the compression sub-valve 15 and the compression main valve 16 open successively during the compression stroke, thereby allowing the valve characteristics to be changed in two stages. In addition, the valve characteristics can be adjusted for each of the extension and compression strokes. Consequently, it is possible to increase the degree of freedom for setting damping force characteristics and hence possible to obtain appropriate damping force characteristics.

As shown in FIG. 3, when the compression sub-valve 15 opens, the sub-disk 30 abuts against the restricting portions 21 of the piston 3 to limit the amount of deflection of the sub-disk 30, thereby preventing excessive deformation of the sub-disk 30.

Figure 8:
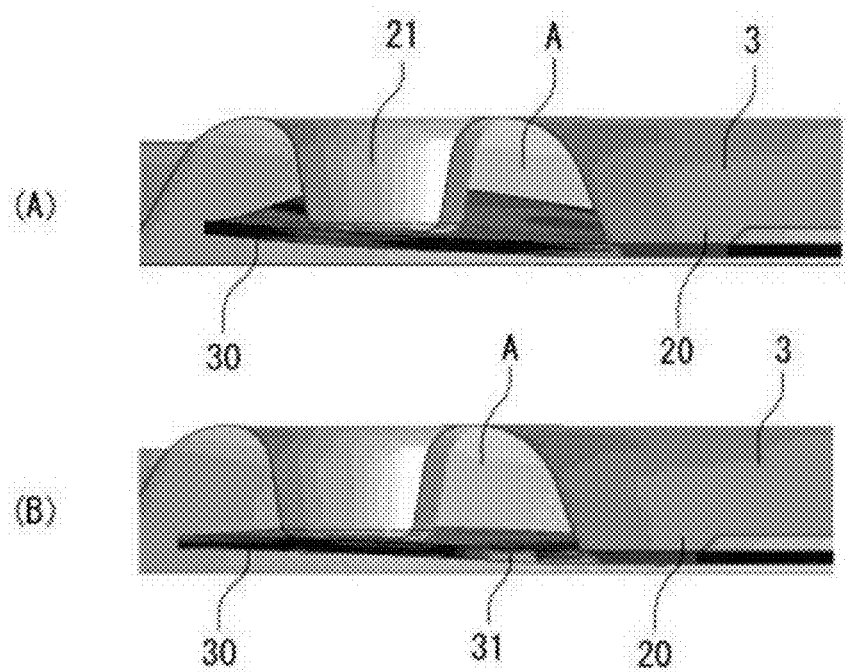
FIG. 8 is a sectional view showing the way in which the sub-disk, is deformed when opened, in the sub-valve of the damping force generating mechanism shown in FIG. 2.

In addition, when the compression sub-valve 15 opens, the communicating holes 31 provide communication between the sub-passage 29 and an area A on the inner peripheral side of the restricting portions 21, thereby reducing differential pressure between the sub-passage 29 side and passage 10 side of the sub-disk 30. Further, the provision of the communicating holes 31 reduces the flexural rigidity of the sub-disk 30 in the vicinity of a portion thereof clamped by the clamp portion 20, which provides a fulcrum for deflection of the sub-disk 30 when opened. It has been analytically verified that, as shown in FIG. 8(B), when opened, the sub-disk 30 is bent in an upward convex shape. Due to the fact that the sub-disk 30 is bent in an upward convex shape when opened, tensile stress occurring in the lower surface (passage disk 24-side surface) of the sub-disk 30 is reduced, and compression stress occurs. The reduction in the flexural rigidity allows an increase in the area of contact between the sub-disk 30 and each restricting portion 21, and hence the sub-disk 30 and each restricting portion 21 are in surface contact with each other. Accordingly, it is possible to relax the stress concentration at the points of contact between the sub-disk 30 and the restricting portions 21. It should be noted that FIG. 8(A) shows an analysis result of a sub-disk 30 having no communicating holes 31 for comparison. FIG. 8(A) reveals that, when opened, the sub-disk 30 having no communicating holes 31 is bent in a downward convex shape. It has been proved that, if the sub-disk 30 is bent in a downward convex shape when opened, tensile stress occurs in the lower surface of the sub-disk 30, and the area of contact between each restricting portion 21 and the sob-disk 30 reduces, resulting in a point contact, which increases the stress gradient (rate of increase of stress with respect to differential pressure) after the restricting portions 21 have contacted the sub-disk 30, resulting in the sub-disk 30 becoming easy to break.

Figure 9:
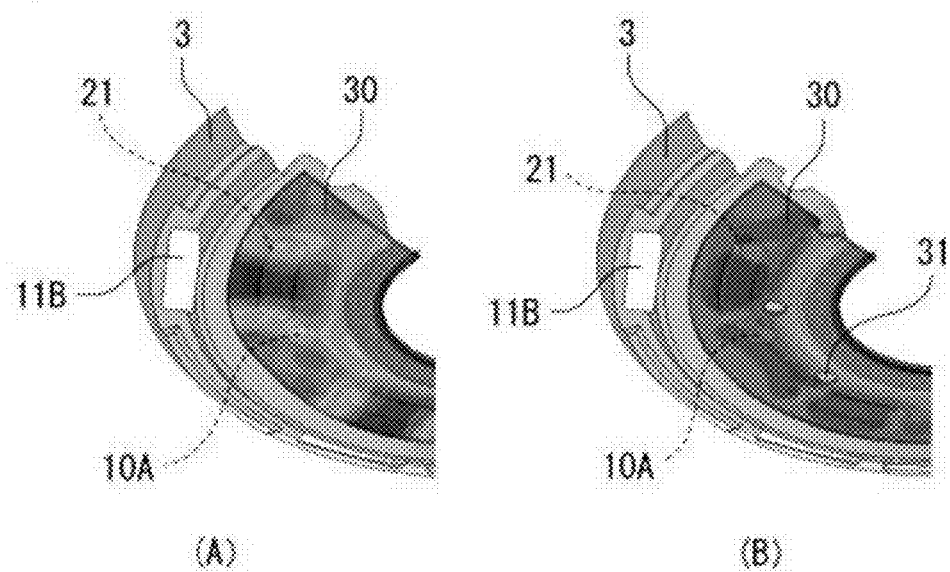
FIG. 9 is a perspective view showing the stress distribution in the sub-disk when opened in the sub-valve of the damping force generating mechanism shown in FIG. 2.

FIG. 9 shows a stress distribution in the sub-disk 30 when opened. In FIG. 9, the stress distribution is represented by shading which gets lighter with the increase in stress.

The sub-disk 30 can relax the concentration of stress in the vicinity of the clamped portion in addition to at the points of contact between the sub-disk 30 and the restricting portions 21, as shown in FIG. 9(B), by providing the communicating holes 31 to thereby reduce the flexural rigidity in the vicinity of the clamped portion. As shown in FIG. 9(A), the sub-disk 30 provided with no communicating holes 31 is easy to break because of the concentration or stress at the point, of contact between the sub-disk 30 and each restricting portion 21 and in the vicinity of the clamped portion.

Thus, the provision of the communicating holes 31 in the sub-disk 30 allows relaxation of stress concentration and hence improvement in durability of the sub-disk 30. It should be noted that the number, location, spacing, size and shape of the communicating holes 31 may be changed appropriately. Further, the sub-disk 30 makes it possible to reduce damping force in a very low piston speed region and hence possible to increase the degree of freedom for tuning the damping force characteristics. In addition, it is possible to reduce noise generated when the sub-disk 30 abuts against the restricting portions 21 when opened owing to the relaxation of stress concentration and the change of the contact between each restricting portion 21 and the sub-disk 30 from a point contact to a surface contact.

Although in the foregoing embodiment the present invention has been explained with regard to a mono-tube shock absorber having a damping force generating mechanism provided in a piston assembly, it should be noted that the present invention is not limited thereto but similarly applicable to other shock absorbers, for example, a shock absorber having a damping force generating mechanism provided in a part thereof other than the piston assembly, e.g. on the side surface of the cylinder, or a dual-tube shock absorber having a reservoir, provided that the shock absorber has a damping force generating mechanism structured to have a sub-disk incorporated in a disk valve.

Further, although the foregoing embodiment shows an example in which the first damping force generating mechanism 12 and the second damping force generating mechanism 13 are provided with the compression sub-valve 15 and the extension sub-valve 17, respectively, the arrangement may be such that only the compression sub-valve 15, for example, is provided to create a difference in damping force characteristics between the extension stroke and the compression stroke. Providing only the compression sub-valve 15 makes it possible to lower the damping force only in the very low speed region of the piston speed during the compression stroke in comparison to the damping force for the extension stroke. Such a structure makes it possible to increase the degree of freedom for tuning the damping force characteristics.

REFERENCE SIGNS LIST

1 . . . shock absorber, 2 . . . cylinder, 3 . . . piston (valve body), 4 . . . piston rod, 10 . . . passage, 12 . . . extension damping force generating mechanism (damping force generating mechanism), 14 . . . extension main valve (main valve), 15 . . . compression sub-valve (sub-valve), 19 . . . seat portion, 20 . . . clamp portion, 21 . . . restricting portions, 24 . . . passage disk (disk), 29 . . . sub-passage, 30 . . . sub-disk, 31 . . . communicating holes.

The invention claimed is:

1. A shock absorber comprising:
a cylinder having a hydraulic fluid sealed therein;
a piston slidably fitted in the cylinder;
a piston rod connected to the piston and extended to an outside of the cylinder; and
a damping force generating mechanism generating a damping force by controlling a flow of hydraulic fluid induced by sliding movement of the piston in the cylinder;
the damping force generating mechanism comprising:
a valve body having a passage through which the hydraulic fluid flows;
a clamp portion which projects from a position on inner peripheral side of an opening of the passage in the valve body and a seat portion which projects from a positions on an outer peripheral side of the opening of the passage in the valve body;
a main valve including a stack of a plurality of disks whose inner peripheral portion is clamped by the clamp portion and whose outer peripheral portion is seated on the seat portion to close the passage and deflected and lifted to open the passage upon receiving a pressure of hydraulic fluid in the passage;
a sub-passage having an opening in the disks seated on the seat portion; and
a sub-valve including a sub-disk smaller in diameter than the disks and clamped at an inner peripheral portion thereof by the disks and the clamp portion, the sub-disk being seated on the disks to close the sub-passage and deflected and lifted to open the sub-passage upon receiving a pressure of hydraulic fluid in the sub-passage;
wherein the valve body is provided with a restricting portion that abuts against the sub-disk when the sub-valve is opened to limit a degree of opening of the sub-valve, and the sub-disk is provided with a communicating hole radially inward of a position at which the sub-disk abuts against the restricting portion, the restricting portion being provided so as to project between the clamp portion and the seat portion.

2. The shock absorber of claim 1, wherein the communicating hole is provided at a position where the communicating hole does not communicate with the sub-passage when the sub-disk is positioned to close the sub-passage.

3. The shock absorber of claim 2, wherein the piston is provided with a first damping force generating mechanism generating a damping force during an extension stroke and a second damping force generating mechanism generating a damping force during a compression stroke, the sub-valve being provided in only the second damping force generating mechanism.

4. The shock absorber of claim 1, wherein the piston is provided with a first damping force generating mechanism generating a damping force during an extension stroke and a second damping force generating mechanism generating a damping force during a compression stroke, the sub-valve being provided in only the second damping force generating mechanism.

* * * * *